H. G. CARNELL.
CARBURETER.
APPLICATION FILED MAR. 29, 1915.

1,228,294.

Patented May 29, 1917.

Witnesses
C. H. Kruger
M. E. Wortman

Inventor
Harry G. Carnell,
By Kerr, Page, Cooper & Hayward,
Attorney

UNITED STATES PATENT OFFICE.

HARRY G. CARNELL, OF DAYTON, OHIO.

CARBURETER.

1,228,294.  Specification of Letters Patent.  Patented May 29, 1917.

Application filed March 29, 1915. Serial No. 17,871.

*To all whom it may concern:*

Be it known that I, HARRY G. CARNELL, a citizen of the United States, residing at Dayton, in the county of Montgomery and State of Ohio, have invented certain new and useful Improvements in Carbureters, of which the following is a full, clear, and exact description.

My invention relates to a class of carbureters wherein the fuel valve is controlled by one of two air valves, and its principal object is to establish such a relationship between the air valves that the controlling valve will be moved by the air it admits a distance proportional to the total amount of air admitted by both valves, and to provide a fuel valve of such form and dimensions that the flow of fuel will be proportional to the distance it is moved by the controlling valve, to the end that the quality of the mixture will remain the same regardless of the quantity, and not be affected by sudden changes in the quantity demanded.

Another object is to provide a simple adjustment for varying the quality of the mixture. Another object is to provide means whereby the driver of an automobile can alter the quality of the mixture without leaving the seat. Another object is to isolate the fuel orifice, thus avoiding the trouble so frequently caused by particles of dirt obstructing the fuel flow.

Figure 1:
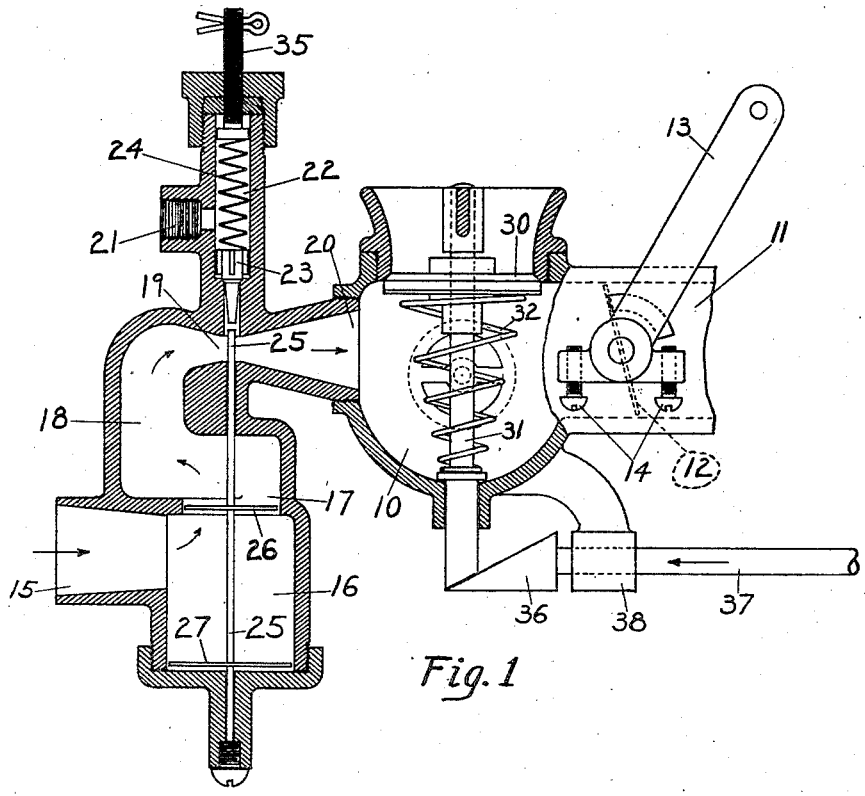
Figure 3:
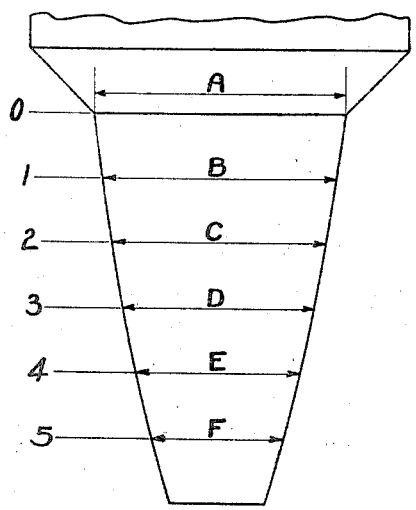
Figure 2:
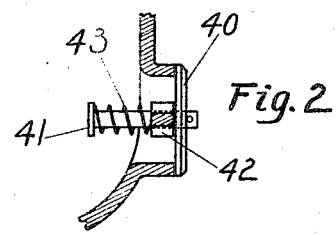
Figure 4:
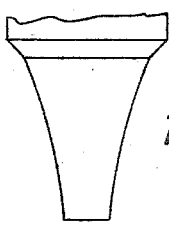

In the accompanying drawing, Figure 1 is a vertical section, partly in elevation.
Fig. 2 is a detail showing the construction of the relief valve. Figs. 3 and 4 are details of the fuel valve, showing modifications thereof.

Similar numerals refer to similar parts in all of the views.

The mixing chamber 10 is connected to a tube 11, in which a throttle 12 is located. The throttle is operated by an arm 13, set screws 14 confining the movements of the arm within proper limits. Air admitted at opening 15 traverses passages 16, 17, 18, 19, and enters the chamber at 20. Fuel is supplied by a pipe (not shown) screwed into a socket 21 and flows into a chamber 22 and past a valve 23 into passage 19, which passage has the form of a Venturi choke tube. A spring 24 tends to close the valve. A small rod 25, arranged to slide freely in suitable guides, carries a disk 26 that acts as a sort of valve, or shutter, to cut chamber 16 off from passage 18, the disk practically filling the short cylindrical intermediate passage 17. Chamber 16 is also cylindrical, and a disk 27 carried by rod 25 co-
operates with the lower part of the chamber to form a dash pot. Rod 25 is in longitudinal alinement with valve 23, and when it is lifted by air pressure on valve 26 it lifts and opens valve 23. Spring 24 therefore controls and tends to close valve 26. Disk 26 is called a valve in the absence of a better term. It is simply a medium whereby the fuel feed is made proportional to the air admitted to the mixing chamber.

An auxiliary valve 30 is arranged to admit air to the mixing chamber. This valve is mounted to slide freely on a relatively stationary stem 31, and a spring 32 tends to keep the valve closed.

It is obvious that suction at tube 11 will draw air in at valves 26 and 30. The amount of air each valve admits is inversely proportional to the tension of the spring controlling it. For example: If a given suction at 11 draws in a given quantity of air at valve 26, the amount of air may be increased by lessening the tension of spring 24, or it may be diminished by increasing the tension of said spring.

Varying the tension of spring 24 would also affect the amount of air admitted by valve 30. With the same given suction at 11, were the tension of spring 24 increased the resulting diminution of air would raise the vacuum in the mixing chamber and this would cause more air to enter at valve 30. The increase in influx at valve 30 would not, however, equal the loss at valve 26. This is because the amount of air admitted by both valves is inversely proportional to the combined tension of the springs, and since increasing the tension of one spring increases their combined strength the influx of air is reduced and the vacuum in the mixing chamber correspondingly increased.

From the foregoing it is seen that each valve is controlled directly by its own spring and indirectly by the spring of the other valve. Moreover, the proportion of air delivered by the valves is determined by the relative tension of the springs. For example: With springs of suitable relative tension one valve might be made to deliver one-third and the other two-thirds of the air. With a given total influx each valve will occupy a certain position relative to some fixed point. If the total influx be doubled each valve will move a certain distance from its former position. If the influx be again increased by the same amount the valves will move approximately the same distance they moved the first time. In other words, each valve will be removed from a given fixed point a distance approximately proportional to the total amount of air which is being received into the mixing chamber.

Within reasonable limits the compression (or expansion) of a coiled spring will be proportional to the stress it is subjected to; i. e., if it compresses a given distance under a given load, it will compress double that distance under double the load, treble the distance under treble the load, etc. I call the distance a spring compresses under a given load its coefficient of strain. The reason I do not call the distance a single coil of the spring compresses its coefficient of strain is because I am interested in the compression of the whole spring rather than in the compression of its individual coils. For example, suppose a spring having forty coils contracts .5″ under a ten pound load: The same spring with four coils cut off would compress only .45″ under a ten pound load; were four more coils cut off, leaving thirty-two, it would only compress .4″ under a ten pound load. As previously stated, with a given total influx each valve will occupy a certain position relative to a given fixed point. The position of each valve at any given time will be governed by the relative tension of the springs, but the distance each valve will move from said position in response to a certain change in suction will be governed by the coefficient of strain of its spring relative to the coefficient of strain of the other spring. Therefore, by establishing a proper relationship between the coefficients of strain of the springs the controlling valve, 26, can be made to move a predetermined distance when the total influx of air varies a given amount.

As valve 23 is lifted by rod 25 it will be moved from its closed position a distance proportional to the total influx of air, and it is desirable that the valve be so formed that it will admit fuel in quantities proportional to its distance from closed position. In Fig. 1 the valve is a tapered pin and it is evident that with other conditions constant the flow of fuel would not increase in proportion to the distance the valve is moved. To secure feeding of fuel in proportion to the distance the valve moves, where other conditions are constant, would require a valve of the shape shown in Fig. 3, in which lines 0 to 5 are equidistant. A represents the diameter of the aperture closed by the valve. When the valve is lifted the distance from 0 to 1 an annular aperture will be formed around the valve having an area equal to A minus B. In order that the annulus shall have double the area when the valve is lifted from 0 to 2 that it has when lifted from 0 to 1, the difference between B and C must be more than double the difference between A and B. This is due to the diminution of the inner diameter of the annulus. It is evident therefore that to have the area of the annulus increase in proportion to the distance the valve moves the valve must be the shape shown in this figure.

The conditions will not remain fixed, however. It has been shown that as the influx increases the vacuum in the mixing chamber will rise, and this will evidently tend to increase the fuel flow. Therefore, in order that the fuel flow shall be proportional to the distance the valve is moved from its closed position the proper shape for the valve may be found to be somewhere between a taper and that of Fig. 3. Or it may be necessary to make the shape the reverse of Fig. 3, as in Fig. 4.

Having found the correct shape for the fuel valve it is only necessary to provide springs with proper relative coefficients of strain. While they could be given practically the required qualities in the course of manufacture it may be necessary to adjust them slightly when the carbureters are assembled. This may be done by making one of them with a view to this adjustment. For example, spring 24 may be made with a few coils more than it should have, and then cut off whatever is necessary to produce the desired result. The adjustment should be such that a given variation of influx, say doubling it, will cause the valve 26 to move the distance the fuel valve should move in order to make the necessary variation in fuel feed. If moving the fuel valve a given distance will cause it to deliver twice as much fuel, the springs should be so adjusted that doubling the influx will move the valve 26 the same given distance. When so adjusted the quality of the mixture will remain unchanged regardless of its quantity. Variation in quality may be effected, however, by varying the relative tension of the springs, and for this purpose an adjusting screw 35 is provided. If a richer mixture is desired the tension of spring 24 may thereby be reduced; if a leaner mixture is wanted the tension should be increased. Since reducing the tension of spring 24 will enrich the mixture increasing the tension of spring 32 will have the same effect.

For certain purposes it may be desirable to temporarily enrich the mixture, say when the engine is being started. For this purpose a cam 36 is provided. This cam is carried by a rod 37 arranged to slide in a guide 38, and may be operated from a distance. Moving the rod in the direction indicated by the arrow will raise the valve stem 31. The stem has a flange on which the lower end of spring 32 rests, and therefore lifting the stem increases the tension of the spring. The rod 37 may be extended to and operated from the seat of an automobile. The mixture may therefore be varied by the driver without leaving his seat.

A relief valve 40 is provided to protect the parts from injury in case of "back firing." It is carried by a stem 41 mounted to slide in a guide 42 and is held closed by a spring 43.

The isolation of the fuel orifice, before referred to, is too apparent in the drawing to require description. Situated as it is it is practically impossible for the orifice to become clogged with dirt carried in by the air. As the fuel is introduced at the most contracted part of the Venturi tube the air will pass the fuel inlet at a high velocity, resulting in the effective atomization of the fuel.

It is to be understood that various modifications may be made in the structure of my carbureter without departing from the invention defined by or exceeding the scope of the appended claims.

What I claim is as follows:

1. A carbureter having a mixing chamber, a controlling valve and a secondary valve adapted to admit air simultaneously to the mixing chamber, a spring tending to close each valve; the relationship between the coefficients of strain of said springs being such that the controlling valve will be moved from a given fixed point a predetermined distance for each proportional increase in the amount of air admitted by both valves.

2. A carbureter having a mixing chamber, a controlling valve and a secondary valve adapted to admit air simultaneously to said chamber, and a spring tending to close each valve, the relationship between the coefficients of strain of said springs being such that the controlling valve will be moved from a given fixed point a predetermined distance for each proportional increase in the total amount of air entering the mixing chamber; a fuel valve, and connecting means whereby the controlling valve moves the fuel valve in one direction.

3. A carbureter having a mixing chamber, a controlling valve and a secondary valve adapted to admit air simultaneously to said chamber, and a spring tending to close each valve, the relationship between the coefficients of strain of said springs being such that the controlling valve will be moved from a given fixed point a predetermined distance for each proportional increase in the total amount of air entering the mixing chamber; and a fuel valve of such form that it will admit fuel in quantities proportional to its distance from a fixed point and of such dimensions that said quantities will be proportional to the total amount of air admitted to the mixing chamber.

4. A carbureter having a mixing chamber, a controlling valve and a secondary valve adapted to admit air simultaneously to said chamber, and a spring tending to close each valve, the relationship between the coefficients of strain of said springs being such that the controlling valve will be moved from a given fixed point a predetermined distance for each proportional increase in the total amount of air entering the mixing chamber; a fuel valve of such form that it will admit fuel in quantities proportional to its distance from a fixed point and of such dimensions that said quantities will be proportional to the total amount of air admitted to the mixing chamber, and connecting means whereby the controlling valve opens the fuel valve and the controlling valve spring closes both valves.

5. A carbureter having a mixing chamber, a controlling valve and a secondary valve adapted to admit air simultaneously to said chamber, and a spring tending to close each valve, the relationship between the coefficients of strain of said springs being such that the controlling valve will be moved from a given fixed point a predetermined distance for each proportional increase in the total amount of air entering the mixing chamber; a fuel valve of such form that it will admit fuel in quantities proportional to its distance from a fixed point and of such dimensions that said quantities will be proportional to the total amount of air admitted to the mixing chamber, connecting means whereby the controlling valve opens the fuel valve and the controlling valve spring closes both valves, and means for varying the relative tension of the springs.

6. A carbureter having a mixing chamber, a controlling valve and a secondary valve adapted to admit air simultaneously to said chamber, and a spring tending to close each valve, the relationship between the coefficients of strain of said springs being such that the controlling valve will be moved from a given fixed point a predetermined distance for each proportional increase in the total amount of air entering the mixing chamber; a fuel valve of such form that it will admit fuel in quantities proportional to its distance from a fixed point and of such dimensions that said quantities will be proportional to the total amount of air admitted to the mixing chamber, connecting means whereby the controlling valve opens the fuel valve and the controlling valve spring closes both valves, and means for varying the tension of either or both springs.

7. A carbureter having a mixing chamber, a controlling valve and a secondary valve adapted to admit air simultaneously to said chamber, and a spring tending to close each valve, the relationship between the coefficients of strain of said springs being such that the controlling valve will be moved from a given fixed point a predetermined distance for each proportional increase in the total amount of air entering the mixing chamber; a fuel valve of such form that it will admit fuel in quantities proportional to its distance from a fixed point and of such dimensions that said quantities will be proportional to the total amount of air admitted to the mixing chamber, connecting means whereby the controlling valve opens the fuel valve and the controlling valve spring closes both valves, and a cam adapted to be operated from a distance for varying the tension of one of the springs.

8. A carbureter having a mixing chamber, a controlling valve and a secondary valve adapted to admit air simultaneously to said chamber, and a Venturi tube through which air admitted by the controlling valve passes to the mixing chamber; a spring tending to close each valve, the relationship between the coefficients of strain of said springs being such that the controlling valve will be moved from a given fixed point a predetermined distance for each proportional increase in the total amount of air entering the mixing chamber; a valve admitting fuel to the Venturi tube, and connecting means whereby the controlling valve opens the fuel valve.

9. A carbureter having a mixing chamber, a controlling valve and a secondary valve adapted to admit air to said chamber, and a Venturi tube through which air admitted by the controlling valve passes to the mixing chamber; a spring tending to close each valve, the relationship between the coefficients of strain of said springs being such that the controlling valve will be moved from a given fixed point a predetermined distance for each proportional increase in the total amount of air entering the mixing chamber; a valve admitting air to the Venturi tube, said valve being of such form that it will admit fuel in quantities proportional to its distance from a given point and of such dimensions that said quantities will be proportional to the total amount of air admitted by both air valves, and connecting means whereby the controlling valve opens the fuel valve.

10. A carbureter having a controlling valve, a secondary valve and a spring for each; said valves being arranged to coöperate in admitting air to the carbureter, each valve being controlled directly by its own spring and indirectly by the spring of the other valve, the relationship between the coefficients of strain of the springs being such that the valves will act in a predetermined manner relative to each other.

11. A carbureter having a controlling valve and a secondary valve, a spring for each, a fuel valve, and a connection between the fuel and controlling valve; the controlling and secondary valves being arranged to coöperate in admitting air to the carbureter and so that each is controlled directly by its own spring and indirectly by the spring of the other, the relationship between the coefficients of strain of the springs being such that the valves will act in a predetermined manner relative to each other.

12. A carbureter having a controlling valve which admits part of the air supplied to the motor and a fuel valve, connecting means whereby the former opens the latter, and spring controlled means whereby the controlling valve is maintained at predetermined distances from a given fixed point, said distances being proportional to the total amount of air supplied to the motor.

13. A carbureter having a controlling valve actuated by a relatively small part of the air supplied to the motor and a dash pot piston mounted upon a vertical stem, a cup for said piston, a fuel valve in longitudinal alinement with and adapted to be lifted by said stem, and spring controlled means whereby the controlling valve is maintained at predetermined distances from a given fixed point, said distances being also proportional to the total amount of air supplied to the motor.

In testimony whereof I affix my signature in the presence of two subscribing witnesses.

HARRY G. CARNELL.

Witnesses:
  F. K. FASSETT,
  C. H. KRUGER.